United States Patent
Huffer et al.

(10) Patent No.: US 8,209,835 B2
(45) Date of Patent: Jul. 3, 2012

(54) COMPRESSION SLEEVE SPLITTER AND REMOVAL TOOL

(76) Inventors: Brian J. Huffer, Aliso Viejo, CA (US); Emmett J. Ebner, Coto De Caza, CA (US)

(*) Notice: Subject to any disclaimer, the term of this patent is extended or adjusted under 35 U.S.C. 154(b) by 656 days.

(21) Appl. No.: 12/197,174

(22) Filed: Aug. 22, 2008

(65) Prior Publication Data
US 2010/0043192 A1 Feb. 25, 2010

(51) Int. Cl.
*B23P 19/04* (2006.01)

(52) U.S. Cl. .............................. 29/282; 29/270; 29/255

(58) Field of Classification Search ............... 29/282, 29/255, 270, 278, 267, 265; 269/3, 6, 2, 269/143, 249
See application file for complete search history.

(56) References Cited

U.S. PATENT DOCUMENTS

| | | | |
|---|---|---|---|
| 4,260,182 A | 4/1981 | Bruner | |
| 4,279,067 A * | 7/1981 | Jenks | 29/239 |
| 4,361,944 A | 12/1982 | Hamilton | |
| 4,644,656 A * | 2/1987 | Chouinard | 30/362 |
| 4,672,731 A | 6/1987 | Taylor | |
| 4,707,924 A * | 11/1987 | Burney | 30/363 |
| 5,206,996 A * | 5/1993 | McDaniel | 30/101 |
| 5,479,710 A | 1/1996 | Aston | |
| 5,893,553 A * | 4/1999 | Pinkous | 269/249 |
| 5,916,343 A * | 6/1999 | Huang et al. | 82/59 |
| 6,789,791 B2 * | 9/2004 | Genduso | 269/249 |
| 6,928,739 B2 | 8/2005 | Jirele et al. | |
| 7,765,664 B2 * | 8/2010 | Duarte | 29/215 |
| 2010/0043192 A1 * | 2/2010 | Huffer et al. | 29/282 |

* cited by examiner

*Primary Examiner* — Lee D Wilson
(74) *Attorney, Agent, or Firm* — Stetina Brunda Garred & Brucker

(57) ABSTRACT

There is provided a splitting tool for use with a pipe defining a longitudinal pipe axis. The pipe includes an outer wall and an inner wall defining a pipe channel. A ferrule is circumferentially disposed about the outer wall. The splitting tool includes a pipe support member defining an outer periphery that is substantially complimentary in shape to the inner wall. The pipe support member is insertable within the pipe channel to extend at least through the ferrule and to provide radial support to the inner wall. The splitting tool additionally includes a splitter member operatively connected to the pipe support member. The splitter member defines a longitudinal splitting axis that is substantially perpendicular to the pipe axis when the pipe support member is inserted within the pipe channel. The splitter member is moveable along the splitting axis to radially engage with and pierce the ferrule.

10 Claims, 3 Drawing Sheets

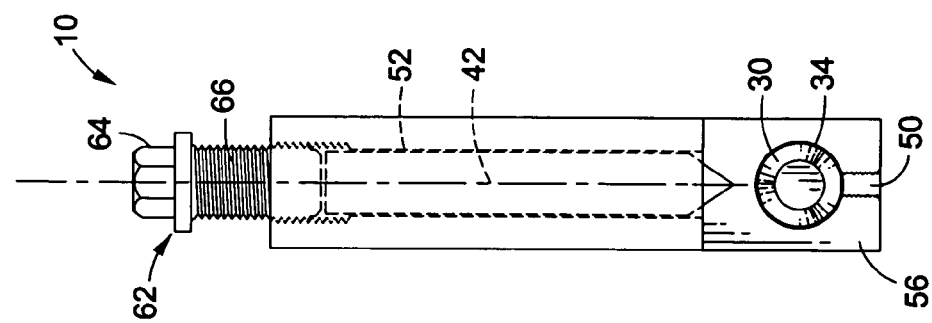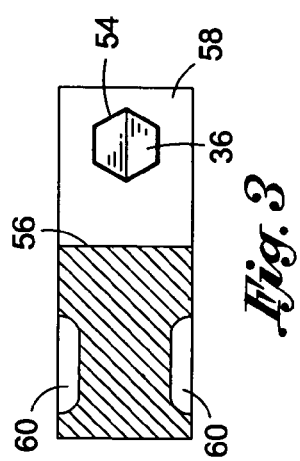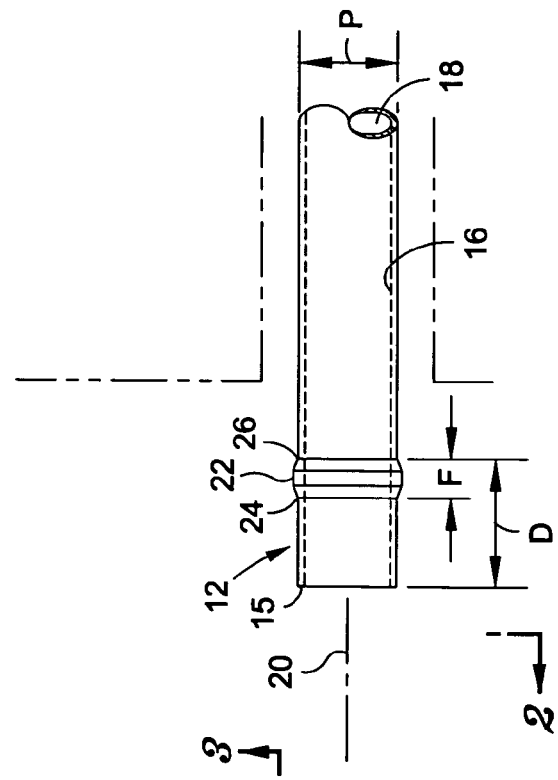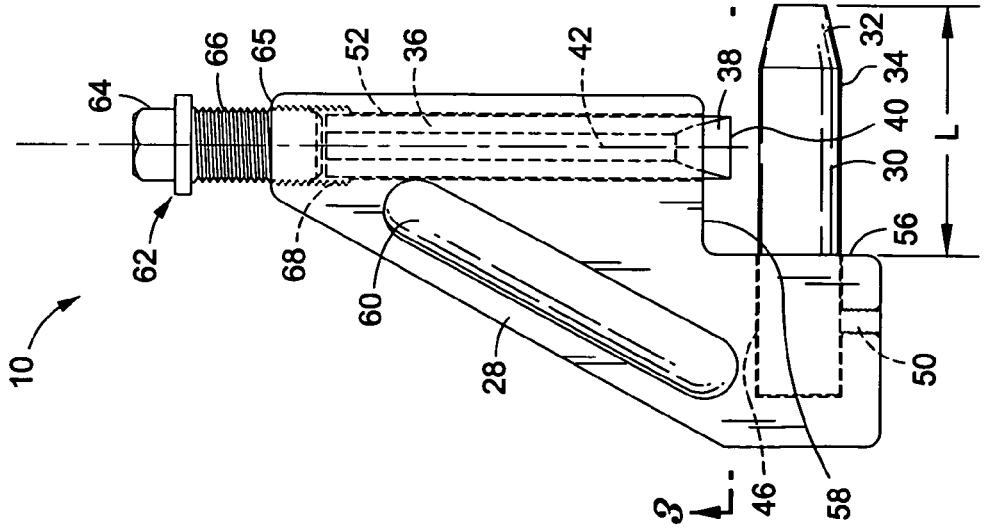

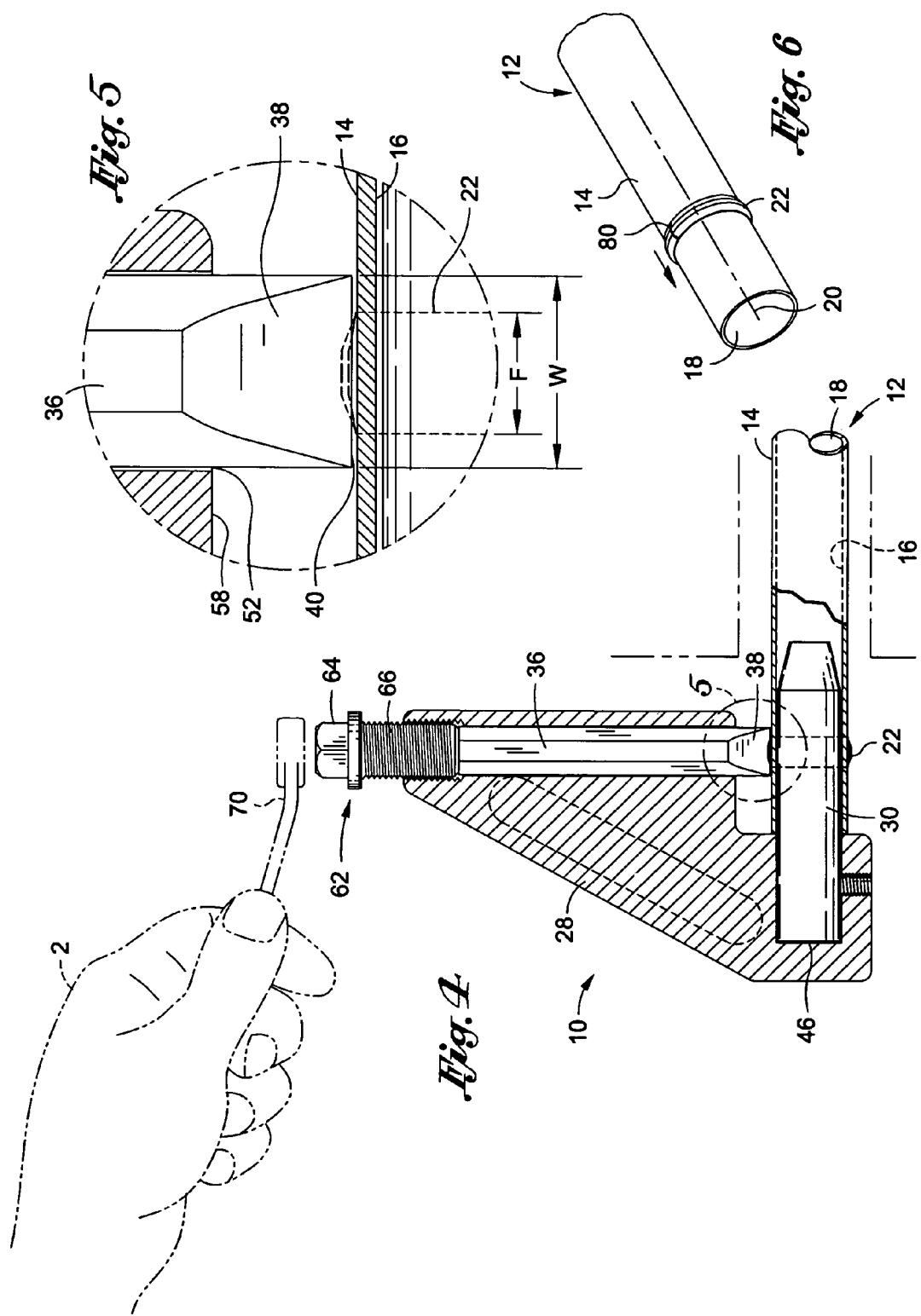

COMPRESSION SLEEVE SPLITTER AND REMOVAL TOOL

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

1. Field of the Invention

The present invention relates generally to plumbing tools and more particularly, to a plumbing tool for removing a compression fitting from a pipe.

2. Description of the Related Art

A plumbing system for a building or house typically includes a network of interconnected pipes distributed throughout the structure. It is generally desirable to control the flow of fluid through the pipes with valves. Accordingly, one or more valves may be connected to the pipes to control the flow of fluid therethrough. In order to form a fluid-tight seal between the valve and the pipe, a compression fitting or ferrule is typically disposed within the pipe-valve connection.

As used herein, a ferrule refers to a band, typically formed of a metallic material, that is circumferentially disposed about the pipe at the connection between the pipe and the valve. The inside diameter of the ferrule is generally slightly larger than the outer diameter of the pipe. The ferrule may be disposed on the pipe adjacent the end where the valve is to be attached.

An internally threaded nut may be placed on the pipe along with the ferrule. After the nut and ferrule have been placed on the pipe, a valve fitting having an externally threaded receptacle is placed in fluid connection to the pipe. The connection between the valve fitting and the pipe is generally achieved by screwing the nut onto the externally threaded receptacle, with the ferrule disposed between the nut and the receptacle. The nut is tightened onto the receptical to create a tight press fit between the receptacle, ferrule and the nut. The tight fit creates a substantially fluid-tight connection. A general description of the use and structure of compression fittings in metal tubing is disclosed in U.S. Pat. No. 4,260,182, the substance of which is incorporated herein by reference.

Over time, the valve may break down and require replacement with a new valve. If the new valve is connected to the existing nut and ferrule, a fluid-tight seal may not be achieved. In addition, the new valve may have a receptical that is a different size from the previous receptical, thereby requiring a different sized nut. Therefore, the original nut and ferrule are generally replaced with a new nut and ferrule. However, before the new nut and ferrule can be disposed on the pipe, the old nut and ferrule are typically removed.

Removing the ferrule from the pipe to allow a replacement valve or fitting to be connected can prove to be difficult. As such, cutting the pipe or metal tubing upstream from the ferrule is one way of allowing the placement of a new valve. However, after cutting the pipe, the remaining portion of pipe may be too short to connect with a replacement valve or fitting. In other words, the pipe may not extend out far enough from the wall or other surface to allow connection of a new valve. Furthermore, cutting the pipe may make re-connecting the other end of the valve to the adjacent pipe very difficult. For instance, the valve may no longer be aligned with the adjacent pipe. As such, cutting of the pipe may require a new section of pipe to be welded to replace the removed pipe. The welding of the new pipe is expensive and time consuming.

Therefore, prior art techniques are used to pull the ferrule off of the pipe in an attempt to avoid the cutting of the pipe, however, such tools may damage the pipe. For example, prior art ferule pulling tools may use a vice and pulling mechanism that could flare or "mushroom" the end of the pipe, or otherwise deform a portion of the pipe. As such, even after using the tool it may be necessary to cut the pipe to remove the deformed portion. In addition, such ferule pulling tools are bulky and it may be difficult to operate such tools in small confines, where plumbing valves are typically hidden from view. An example of one type of ferule pulling type of device may be found at U.S. Pat. No. 4,672,731, the substance of which is incorporated herein by reference.

As is apparent from the foregoing, there exists a need in the art for an improved tool for removing a ferrule from a pipe. The present invention addresses this particular need, as will be discussed in more detail below.

BRIEF SUMMARY OF THE INVENTION

According to an aspect of the present invention, there is provided a splitting tool for use with a pipe defining a longitudinal pipe axis. The pipe includes an outer wall and an inner wall defining a pipe channel. A ferrule is circumferentially disposed on the pipe about the outer wall. The splitting tool includes a pipe support member defining an outer periphery that is substantially complimentary in shape to the inner wall. The pipe support member is insertable within the pipe channel to extend at least through the ferrule and to provide radial support to the inner wall. The splitting tool additionally includes a splitter member structurally connected to the pipe support member. The splitter member defines a longitudinal splitting axis that is substantially perpendicular to the pipe axis when the pipe support member is inserted within the pipe channel. The splitter member is moveable along the splitting axis to radially engage with and pierce the ferrule.

It is contemplated that the splitting tool may facilitate removal of the ferrule from the pipe by piercing the ferrule. In this manner, the engagement between the ferrule and the pipe may be loosened. The splitting tool may also provide support to the inner wall of the pipe to mitigate damage or deformation to the pipe. Furthermore, the splitting tool may be used to remove the ferrule from the pipe without cutting the pipe. In this manner, the length of the pipe may be preserved.

The splitting tool may additionally include an adjustment member that is engageable with the splitter member. The adjustment member may be configured to move the splitter member along the splitting axis to move the adjustment member into engagement with the ferrule.

The splitting tool may further include a body member engaged with the pipe support member and the splitter member. The body member may include an adjustment channel defining a channel axis. The splitter member may be disposable within the adjustment channel to align the channel axis with the splitting axis. The adjustment channel may also define a hexagonal cross section that is substantially perpendicular to the channel axis. The splitter member may also define a hexagonal cross section in a direction that is substantially perpendicular to the splitting axis.

In another embodiment, the splitting tool may include a c-shaped body element. The c-shaped body element may include an engagement portion having an internally threaded engagement channel disposed about an engagement axis. The c-shaped body element may further include an alignment member having an alignment channel disposed about an alignment axis. An pipe support member may be connected to the c-shaped body element and define a longitudinal insertion axis. The pipe support member may be connected to the c-shaped body element to dispose the longitudinal insertion axis substantially perpendicular to the alignment axis. The pipe support member may be sized and configured to be insertable into the pipe channel to provide radial support to the inner surface. The splitting tool may additionally include an engagement rod having external threads configured to engage with the internally threaded engagement channel. The engagement rod may be rotatable to move the engagement rod along the engagement axis. A splitter member may be connected to the engagement rod. The splitter member may be disposable within the alignment channel and moveable along the alignment axis in response to movement of the engagement rod. The splitter member may be configured to radially engage with and pierce the ferrule.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings in which like numbers refer to like parts throughout and in which:

FIG. 1 is a side elevation view of a splitting tool configured to engage with a hollow pipe having a ferrule circumferentially disposed thereon;

FIG. 2 is an end view of the splitting tool illustrated in FIG. 1;

FIG. 3 is a lower sectional view of the splitting toll illustrate in FIG. 1, the splitting tool having an adjustment channel and splitter member each defining complimentary hexagonal cross sections;

FIG. 4 is a side sectional view of the splitting tool engaged with the pipe and the splitter member being advanced through the ferrule, a user and adjustment tool being shown in phantom;

FIG. 5 is an enlarged side sectional view of the splitter member advancing through the ferrule to form a crack in the ferrule;

FIG. 6 is an upper perspective view of the pipe with the ferrule circumferentially disposed about the pipe, the ferrule having a crack formed by the splitting tool.

DETAILED DESCRIPTION OF THE INVENTION

Figure 7:
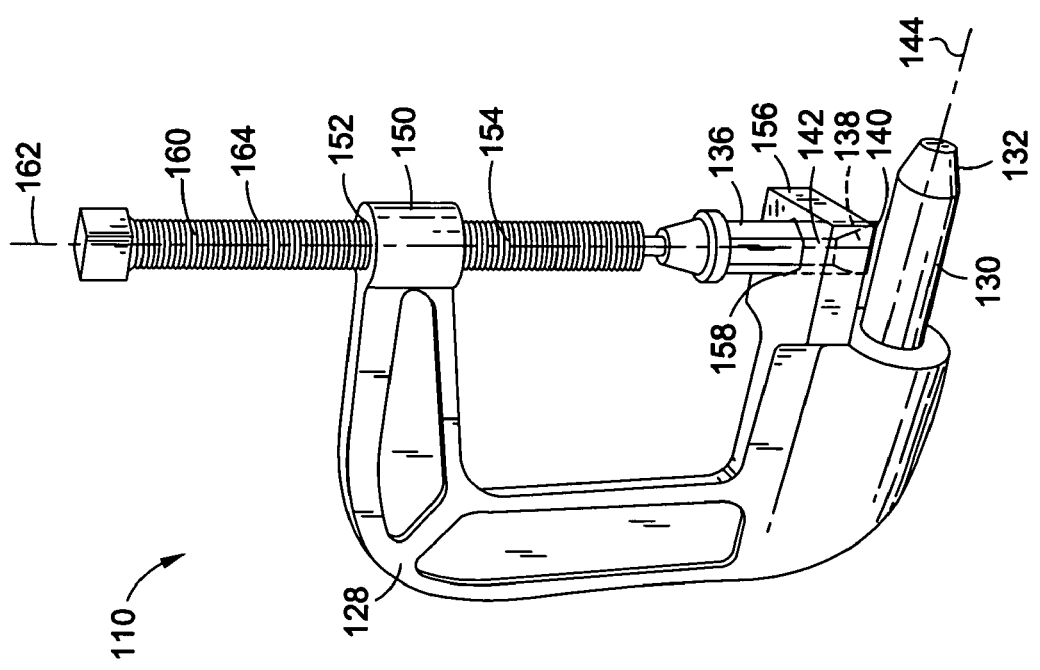
FIG. 7 is an upper perspective view of another embodiment of the splitting tool having a c-shaped body member.

Referring now to the drawings wherein the showings are for purposes of illustrating a preferred embodiment of the present invention only, and not for purposes of limiting the same, FIGS. 1-6 illustrate a splitting tool 10 constructed in accordance with an embodiment of the present invention. The splitting tool 10 may be used to pierce the ferrule 22 or form a crack 80 within a ferrule 22 disposed on a pipe 12. Once the ferrule 22 is pierced or cracked, the engagement between the ferrule 22 and the pipe 12 is typically loosened to facilitate removal of the ferrule 22 from the pipe 12.

As used herein, a pipe 12 refers to an elongate, hollow member for transmitting fluid therein. The pipe 12 defines a longitudinal pipe axis 20. The pipe 12 includes an outer wall 14 and an inner wall 16 that defines a pipe channel 18. It is understood that a residence or commercial structure may include a plumbing system having a network of interconnected pipes 12. A ferrule 22 is an element that is typically circumferentially disposed on the pipe 12. The ferrule 22 helps to create a substantially fluid tight connection between adjacent pipes 12, or to connect a pipe 12 with a valve, such as near a sink or washing machine.

FIG. 1 illustrates a ferrule 22 disposed on a pipe 12. The ferrule 22 includes a ferrule first edge 24 and a ferrule second edge 26 to define a ferrule width F. The ferrule 22 is disposed adjacent a pipe exposed end 15. The ferrule 22 is disposed on the pipe 12 to position the ferrule first edge 24 between the pipe exposed end 15 and the ferrule second edge 26. The distance between the pipe exposed end 15 and the ferrule second edge 26 is referred to as the ferrule depth, "D."

The splitting tool 10 includes an pipe support member 30 that is insertable within the pipe channel 18. Advancement of the pipe support member 30 into the pipe channel 18 properly aligns the splitting tool 10 with the pipe 12. The pipe member 30 is advanced into the pipe channel 18 along the longitudinal pipe axis 20. It is desirable to advance the pipe support member 30 into the pipe channel 18 a distance that is at least equal to the ferrule depth D. In other words, when the pipe support member 30 is fully advanced into the pipe channel 18, the pipe support member 30 extends through the ferrule 22. When the pipe support member 30 is inserted into the pipe channel 18, the pipe support member 30 provides radial support to the inner wall 16 of the pipe 12 as the ferrule 22 is being pierced or cracked, as described in more detail below.

In the embodiment depicted in the drawings, the pipe support member 30 is substantially cylindrical and is sized and configured to be substantially complimentary to the pipe inner wall 16. However, it is understood that the pipe support member 30 may be only partially complimentary to the pipe inner wall 16. For instance, the pipe inner wall 16 may define a substantially circular cross-section, while the pipe support member 30 may define a semi-circular cross section. While the pipe support member is formed of a solid piece of rigid material, it is contemplated that the insert could also have a hollow inner core.

In the embodiment depicted, the outer diameter of the pipe support member 30 is slightly less than the inner diameter of the pipe inner wall 16. This allows for advancement of the pipe support member 30 into the pipe channel 18, but also provides radial support to the pipe inner wall 16, particularly in areas of the pipe 12 adjacent the ferrule 22. Although the embodiments of the pipe support member 30 illustrated in the Figures are substantially cylindrical, it is understood that other shapes and configurations known by those skilled in the art may also be used.

The splitting tool 10 also includes a splitter member 36 operatively connected to the pipe support member 30. The splitter member 36 includes a tapered, chiseled end portion 38 terminating in a cutting edge 40 configured to pierce the ferrule 22. As used herein, the word pierce is intended to describe the action of the splitter member 36 on the ferrule 22. More specifically, when the splitter member 36 pierces the ferrule 22, the engagement between the ferrule 22 and the pipe 12 is loosened. For instance, the splitter member 36 may be advanced into the ferrule 22 to form a crack 80 therein. Once the crack 80 is formed in the ferrule 22, the ferrule 22 may be "opened" for disengagement with the pipe 12.

The splitter member 36 defines a longitudinal splitting axis 42 that is substantially perpendicular to the pipe axis 20 when the pipe support member 30 is inserted within the pipe channel 18. It may be desirable to dispose the cutting edge 40 substantially perpendicular to the ferrule width F, as best illustrated in FIG. 5. Furthermore, the cutting edge 40 defines a splitter width "W" along its length. It may be desirable for the splitter width W to be greater than or equal to the ferrule width F to facilitate contact in piercing of the ferrule 22 by the splitter member 36. The splitter member 36 is moveable along the longitudinal splitting axis 42 to engage with and pierce the ferrule 22.

As the splitter member 36 engages with and advances into the ferrule 22 for purposes of piercing the ferrule 22, the force exerted by the splitter member 36 onto the ferrule 22 may be transmitted to the pipe 12 causing the pipe inner wall 16 to deform. A deformed pipe inner wall 16 may weaken the structural integrity of the pipe 12, as well as cause turbulence in the fluid flow therein. Therefore, the radial support offered by the pipe support member 30 substantially counteracts the deforming force of the splitter member 36 to mitigate deformation of the pipe inner wall 16.

Given that the splitter member 36 is intended to pierce the ferrule 22, and the pipe support member 30 is intended to maintain the shape of the pipe inner wall 16, it is desirable to form the splitter member 36 and the pipe support member 30 out of strong durable materials. Therefore, in one embodiment, the splitter member 36 and/or the pipe support member 30 are formed of a metallic material. However, other materials known by those skilled in the art may also be used.

One embodiment of the splitting tool 10 includes a tool body 28 for structurally connecting the pipe support member 30 to the splitter member 36. As illustrated in FIG. 1 the tool body 28 includes a pipe channel facing surface 56 which faces the pipe channel 18 when the pipe member 30 is advanced therein. An insertion receiving recess 46 protrudes inwardly from the pipe channel facing surface 56. The insertion receiving recess 46 is sized and configured to receive a portion of the pipe support member 30. A fastener 50 may be used to secure the pipe support member 30 into the insertion receiving recess 46. In one embodiment, the fastener 50 is a set screw that is screwed into the body member 28 and secures the pipe support member 30 thereto.

As depicted, the tool body 28 also includes a splitter member protrusion surface 58 from which the splitter member 36 protrudes. The tool body 28 also includes a body upper surface 65. An adjustment channel 52 extends within the tool body 28 between the body upper surface 65 and the splitter member protrusion surface 58. The splitter member 36 is sized and configured to be disposable and moveable within the adjustment channel 52.

Referring now to FIG. 3, there is shown a lower sectional view of the spitting tool 10 to further depict the splitter member 36 and the adjustment channel 52. As can be seen from FIG. 3, the adjustment channel 52 defines the hexagonal cross section 54 in a direction that is substantially perpendicular to the longitudinal splitting axis 42. Furthermore, the splitter member 36 also defines a hexagonal cross section that is complimentary to the hexagonal cross section 54 of the adjustment channel 52. The hexagonal configuration of the adjustment channel 52 and the splitter member 36 helps to maintain the splitting tool 36 properly positioned relative to the ferrule 22 when the pipe support member 38 is advanced into the pipe 12. In other words, the hexagonal configuration substantially maintains the cutting edge 40 in a direction extending between the ferrule first edge 24 and the ferrule second edge 26.

The tool body 28 may also include a gripping member 60 to facilitate gripping of the splitting tool 10. As shown in FIGS. 1 and 3 the gripping member 60 includes opposing grooves formed within the tool body 28. In other embodiments, the gripping member 60 may define other shapes and configurations known in the art, such as a handle.

In one embodiment, the splitting tool 10 includes an adjustment member 62 for advancing the splitter member 36 into the ferrule 22 for purposes of piercing the ferrule 22. In the embodiment depicted, the adjustment member 62 includes a threaded bolt that engages with the splitter member 36. The adjustment member 62 additionally includes an engagement portion 64 configured to engage with an adjustment tool 70 as illustrated in FIG. 4. The adjustment member 62 may also include a shank portion having external threads 66 disposed thereabout. The external threads 66 may engage with internal threads 68 formed within the adjustment channel 52. Therefore, the adjustment member 62 may be screwed into and out of the adjustment channel 52 to engage and disengage with the splitter member 36. As show in FIGS. 1, 2, and 4, the adjustment member 62 is not integrally formed with the splitter member 36. However, it is contemplated that other embodiments may include an adjustment member 62 that is integrally formed with the splitter member 36.

In operation, the adjustment member 62 may be finger-tightened to dispose the splitter member 36 into abutting contact with the ferrule 22. A user 2 may then employ the use of the adjustment tool 70 to further rotate the adjustment member 62 to advance the splitter member 36 into the ferrule 22. The user 2 may apply just enough force to the adjustment tool 70 to pierce the ferrule 22 without damaging the pipe 12, which is typically accomplished through manual means. When the splitter member 36 is sufficiently advanced into the ferrule 22 to form a crack 80, the ferrule 22 may "pop" thereby alerting the user 2 that further rotation of the adjustment member 62 is not required. Thereafter, the user 2 may rotate the adjustment member 62 in a second direction to remove the splitter member 36 from the ferrule 22. Once the crack 80 is formed in the ferrule 22, the ferrule 22 may easily slide off the pipe 12 as illustrated in FIG. 6.

In addition to the foregoing, and referring now to FIG. 7, there is shown another embodiment of a splitting tool 110. The splitting tool 110 includes a c-shaped body member 128 having a top generally horizontal member, a bottom generally horizontal member and an interconnecting generally perpendicular member. The c-shaped body member includes an engagement portion 150 and an alignment member 156. The engagement portion 150 defines an engagement channel 152 disposed about an engagement axis 154. The engagement channel 152 may include internal threads for engagement with a rod 160, as described in more detail below.

The alignment member 156 defines an alignment channel 158 configured to receive a splitter member 136. The splitter member 136 defines a chiseled end portion 138 and cutting edge 140 similar to the splitter member 36 described above. The splitter member 136 and alignment channel 158 may define complimentary hexagonal cross sections. The splitter member 136 extends along a longitudinal splitting axis 142. The splitting tool 110 also includes an pipe support member 130 having a tapered end portion 132. The pipe support member 130 defines a longitudinal insertion axis 144 that is substantially perpendicular to the longitudinal splitting axis 142 when the splitter member 136 is disposed within the alignment channel 158.

The splitting tool 110 may further include an elongate rod 160 connected to the splitter member 136. The rod 160 may include external threads 164 that may engage with the internal threads formed in the engagement channel 152. In this manner, the rod 160 may rotate to move along the engagement axis 154. The rod 160 may be connected to the splitter member 136 to move the splitter member 136 along the longitudinal splitting axis 142. In other words, as the rod 160 rotates, and moves along the rod axis 162, the splitter member 136 may also move along the longitudinal splitting axis 142. As illustrated in FIG. 7, the rod axis 162, engagement axis 154, and longitudinal splitting axis 142 are all coaxially aligned. The splitter member 136 may move along the longitudinal splitting axis 142 to engage with and pierce a ferrule 22 as previously described.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combinations described herein. Thus, the scope of the claims is not to be limited by the illustrated embodiments.

What is claimed is:

1. A method of removing a ferrule from a pipe having a pipe wall, the steps of such method comprising:
    (a) inserting an elongate rigid member into the pipe along a first axis to radially support the pipe wall;
    (b) rotating a threaded shaft connected to said elongate rigid member to provide a force toward the pipe along a line generally perpendicular to said first axis;
    (c) directing a first tapered end of an elongate splitter, member onto the ferrule wherein a second end of splitter member is in contact with said threaded shaft; and
    (d) splitting the ferrule.

2. The method recited in claim 1, wherein step (d) comprises rotating the threaded shaft in an amount sufficient to facilitate the application of a cutting force to the ferrule to split said ferrule.

3. The method recited in claim 1, further comprising the step of removing the ferrule from the pipe.

4. The method recited in claim 1, wherein step (a) includes inserting the elongate rigid member into the pipe such that the elongate rigid member is co-axially aligned with the pipe.

5. The method recited in claim 1, wherein step (d) includes advancing the first tapered end of the splitter member into the ferrule.

6. A method of removing a ferrule from a pipe having a pipe wall, the steps of such method comprising:
    (a) inserting at least a portion of an elongate rigid member into the pipe along a first axis to radially support the pipe wall;
    (b) rotating a threaded shaft which is connected to said elongate rigid member to facilitate the movement of the threaded shaft toward the pipe along a second axis generally perpendicular to said first axis;
    (c) directing a first tapered end of an elongate splitter member onto the ferrule wherein a second end of the splitter member is in contact with said threaded shaft; and
    (d) splitting the ferrule.

7. The method recited in claim 6, wherein step (d) comprises rotating the threaded shaft in an amount sufficient to facilitate the application of a cutting force to the ferrule to split said ferrule.

8. The method recited in claim 6, further comprising the step of removing the ferrule from the pipe.

9. The method recited in claim 6, wherein step (a) includes inserting at least a portion of the elongate rigid member into the pipe such that the elongate rigid member is co-axially aligned with the pipe.

10. The method recited in claim 6, wherein step (d) includes advancing the first tapered end of the splitter member into the ferrule.

* * * * *